(12) United States Patent
Williams

(10) Patent No.: US 12,221,145 B1
(45) Date of Patent: Feb. 11, 2025

(54) LEVERAGE DEVICE FOR USE WITH A HAND TRUCK

(71) Applicant: Alan Williams, Caddo, OK (US)

(72) Inventor: Alan Williams, Caddo, OK (US)

( * ) Notice: Subject to any disclaimer, the term of this patent is extended or adjusted under 35 U.S.C. 154(b) by 310 days.

(21) Appl. No.: 17/900,388

(22) Filed: Aug. 31, 2022

Related U.S. Application Data

(60) Provisional application No. 63/344,987, filed on May 23, 2022.

(51) Int. Cl.
  B62B 1/12 (2006.01)

(52) U.S. Cl.
  CPC ............ B62B 1/12 (2013.01); *B62B 2203/05* (2013.01)

(58) Field of Classification Search
  CPC ......... B62B 1/12; B62B 2203/05; B62B 1/10; B62B 1/008; B62B 1/02
  See application file for complete search history.

(56) References Cited

U.S. PATENT DOCUMENTS

| | | | |
|---|---|---|---|
| 193,401 A * | 7/1877 | Ferris | B62B 1/10 |
| | | | 280/47.27 |
| 868,705 A * | 10/1907 | Schell | B62B 1/10 |
| | | | 188/23 |
| 925,388 A * | 6/1909 | Rowley | B62B 1/10 |
| | | | 188/23 |
| 7,431,314 B2 * | 10/2008 | Donaldson | B60B 29/002 |
| | | | 280/47.27 |
| 12,116,892 B2 * | 10/2024 | Sommers | E21B 7/028 |
| 12,122,438 B2 * | 10/2024 | Lawrence | B62B 1/12 |
| 2018/0057035 A1 * | 3/2018 | Choi | B62B 9/26 |
| 2023/0303148 A1 * | 9/2023 | Duffy | B62B 5/049 |

FOREIGN PATENT DOCUMENTS

| | | | | |
|---|---|---|---|---|
| EP | 1632415 A2 * | 3/2006 | | B62B 1/10 |
| NZ | 540100 A * | 11/2007 | | C07K 14/47 |

* cited by examiner

*Primary Examiner* — James A Shriver, II
*Assistant Examiner* — Michael T. Walsh
(74) *Attorney, Agent, or Firm* — Richard Eldredge; Leavitt Eldredge Law Firm

(57) ABSTRACT

A leverage device for use with a hand truck, the leverage device includes a body extending from a top end to a bottom end and from a first side end to a second side end, the body having a front surface and a back surface; and an opening extending from the first side end to the second side end; the opening receives an axle of the hand truck; and the front surface receives a user's foot to apply leverage to the hand truck.

10 Claims, 7 Drawing Sheets

LEVERAGE DEVICE FOR USE WITH A HAND TRUCK

BACKGROUND

1. Field of the Invention

The present invention relates generally to hand truck systems, and more specifically, to a leverage device and system for use with hand trucks to improve leverage for the user and reduce pressure applied to a user's foot.

2. Description of Related Art

Hand truck systems are well known in the art and are effective means to move items, such as boxes. For example, FIG. 1 depicts a conventional hand truck 101 having a frame 103 with a handle 105 and two wheels 107, 109 connected via an axle 111. During use, the user will commonly apply pressure to the axle via their foot to lift the load up and transport it via the wheels.

One of the problems commonly associated with hand truck 101 is high pressure on the user's foot as well as limited leverage. This can cause discomfort for the user and decrease the efficiency of the system.

Accordingly, although great strides have been made in the area of hand truck systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
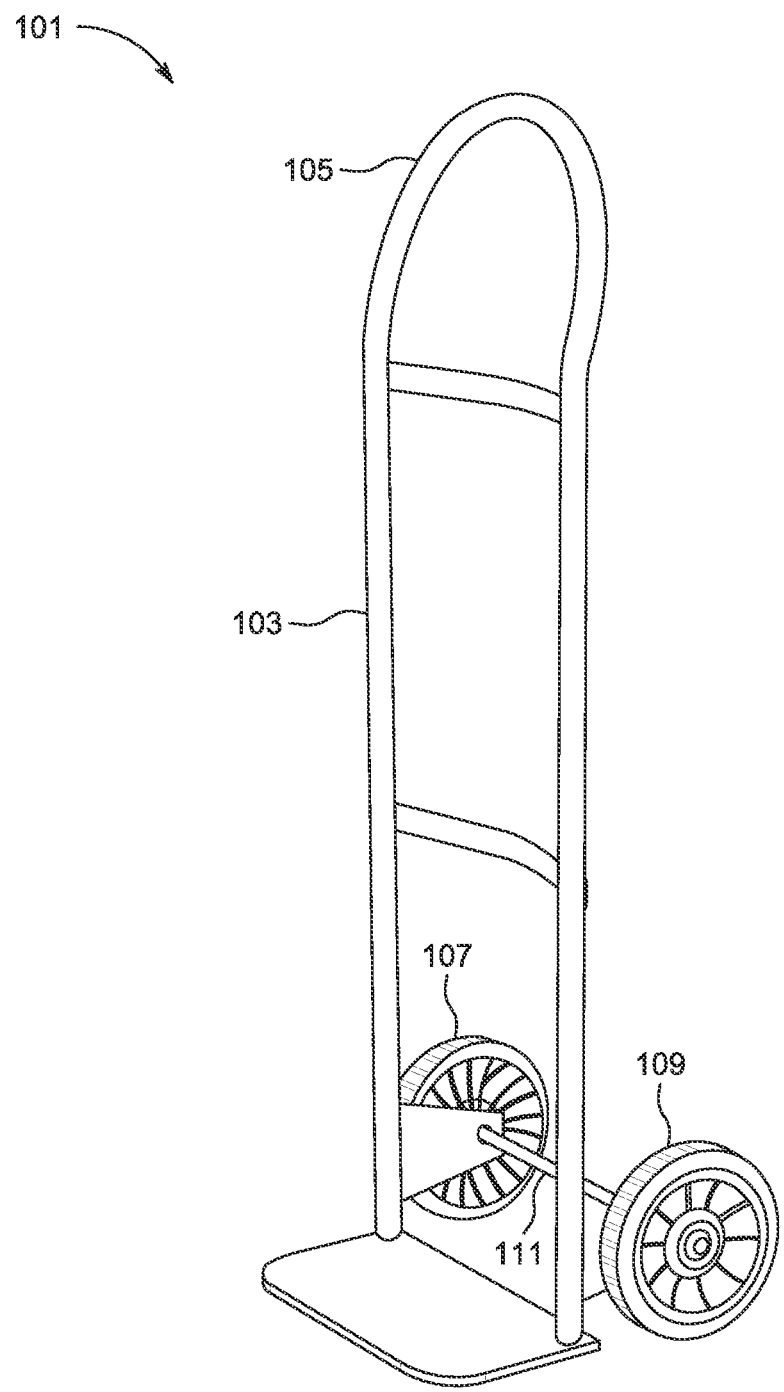
FIG. 1 is a side isometric view of a common hand truck.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional hand truck systems. Specifically, the present invention provides for a leverage device that decreases the pressure applied to a user's foot while increasing leverage applied to the hand truck during use. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
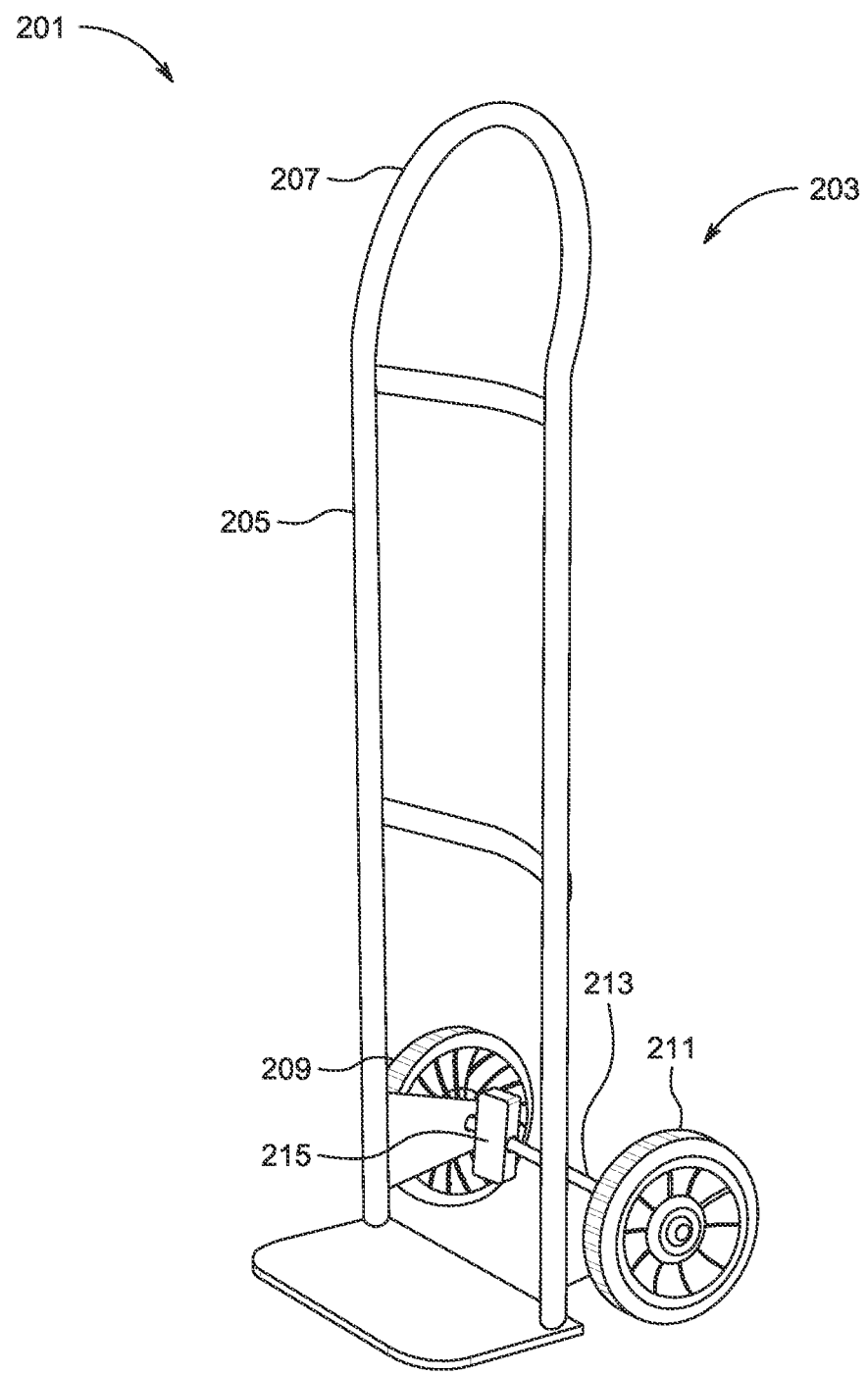
FIG. 2 is a side isometric view of a leverage system for a hand truck in accordance with a preferred embodiment of the present application.

Referring now to the drawings wherein like reference characters identify corresponding or similar elements throughout the several views, FIG. 2 depicts a side isometric view of a leverage system 201 for use with a hand truck 203 in accordance with a preferred embodiment of the present application. It will be appreciated that system 201 overcomes one or more of the above-listed problems commonly associated with conventional hand truck systems.

In the contemplated embodiment, system 201 includes the hand truck 203, with a frame 205 and a handle 207. The hand truck further having at least two wheels 209, 211 connected via an axle 213. It should be appreciated that the hand truck can vary in elements, form, materials, and the like as is known and common in the art. Further, it should be appreciated that the axle 213 may be permanent or removable.

System 201 further includes a leverage device 215, the leverage device 215 being secured to the axle 213 for use. It should be appreciated that the leverage device 215 may be permanently affixed or removably affixed to the axle.

It should be appreciated that one of the unique features believed characteristic of the present application is the leverage device 215 which provides for improved use of the hand truck. The leverage device 215 will decrease the pressure applied to the arch of the user's foot during use and gives a convenient foot grip to apply leverage.

Figure 3:
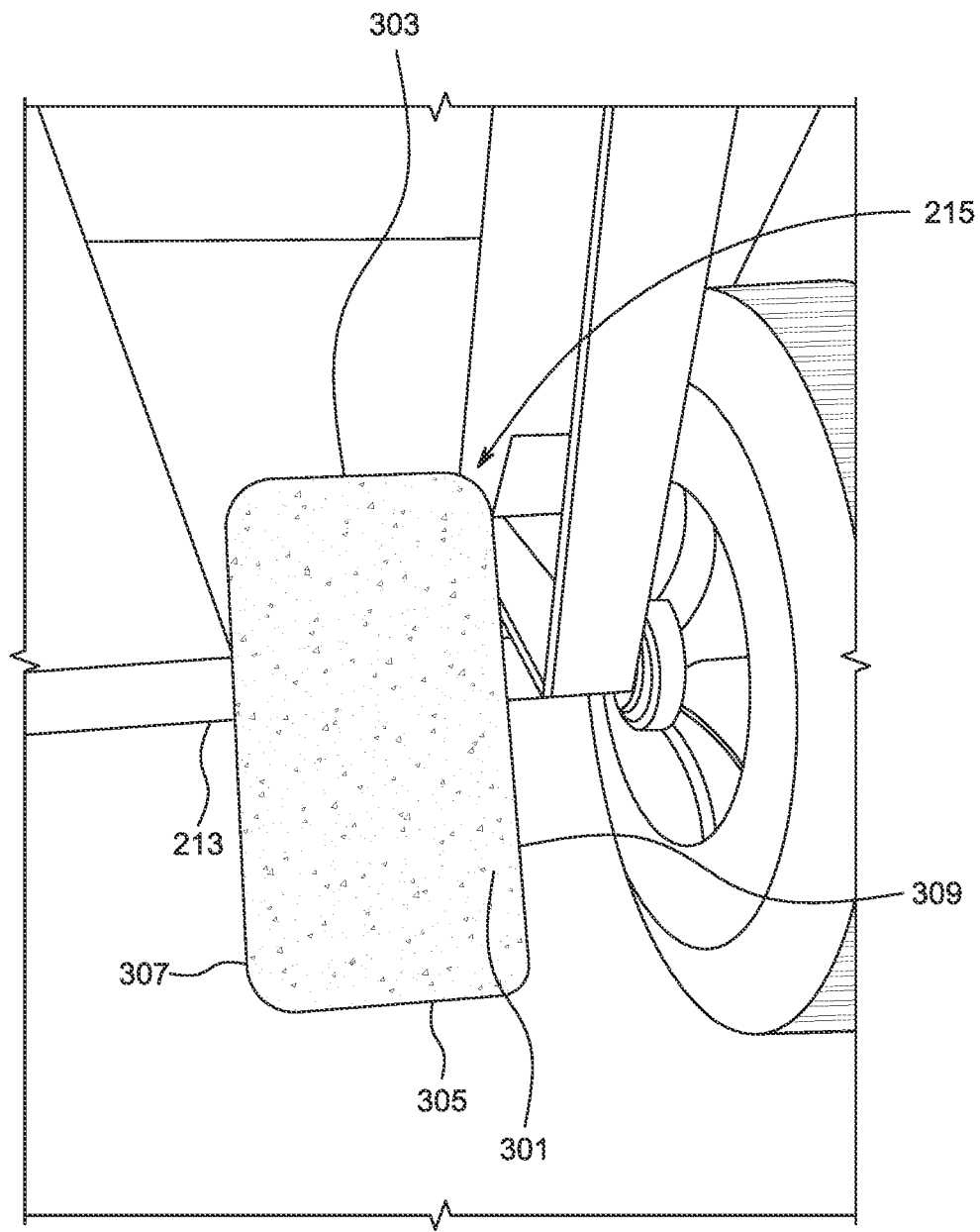
FIG. 3 is a front view of the leverage device of FIG. 2.

As shown in FIG. 3, leverage device 215 includes a body 301 extending from a top end 303 to a bottom end 305 and from a first side end 307 to a second side end 309, the body having a front surface 311 and a back surface 501. In some embodiments, the front surface 311 is textured, thereby providing for improved grip by the user's foot during use.

Figure 4:
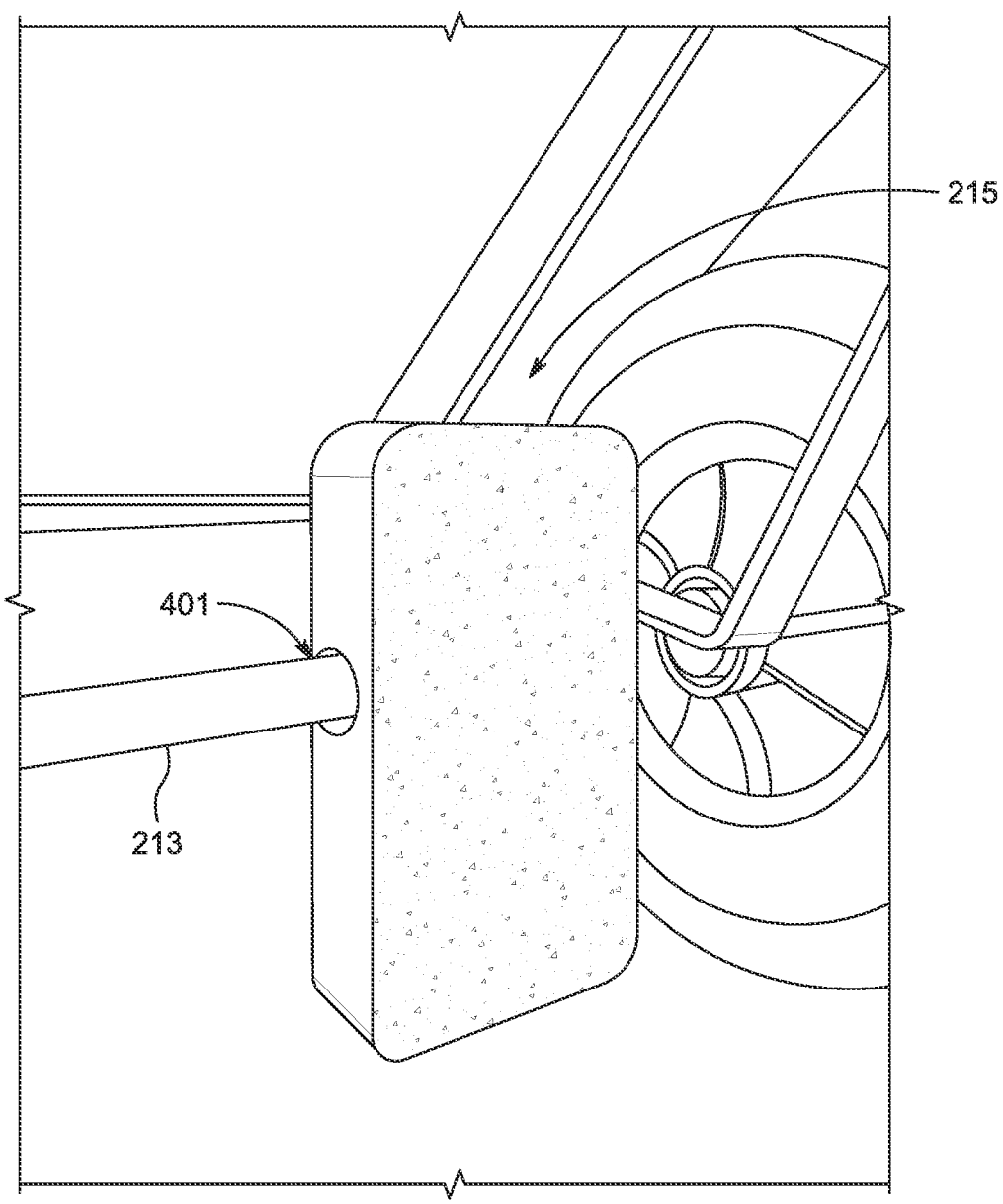
FIG. 4 is a side isometric view of the leverage device of FIG. 2.
Figure 5:
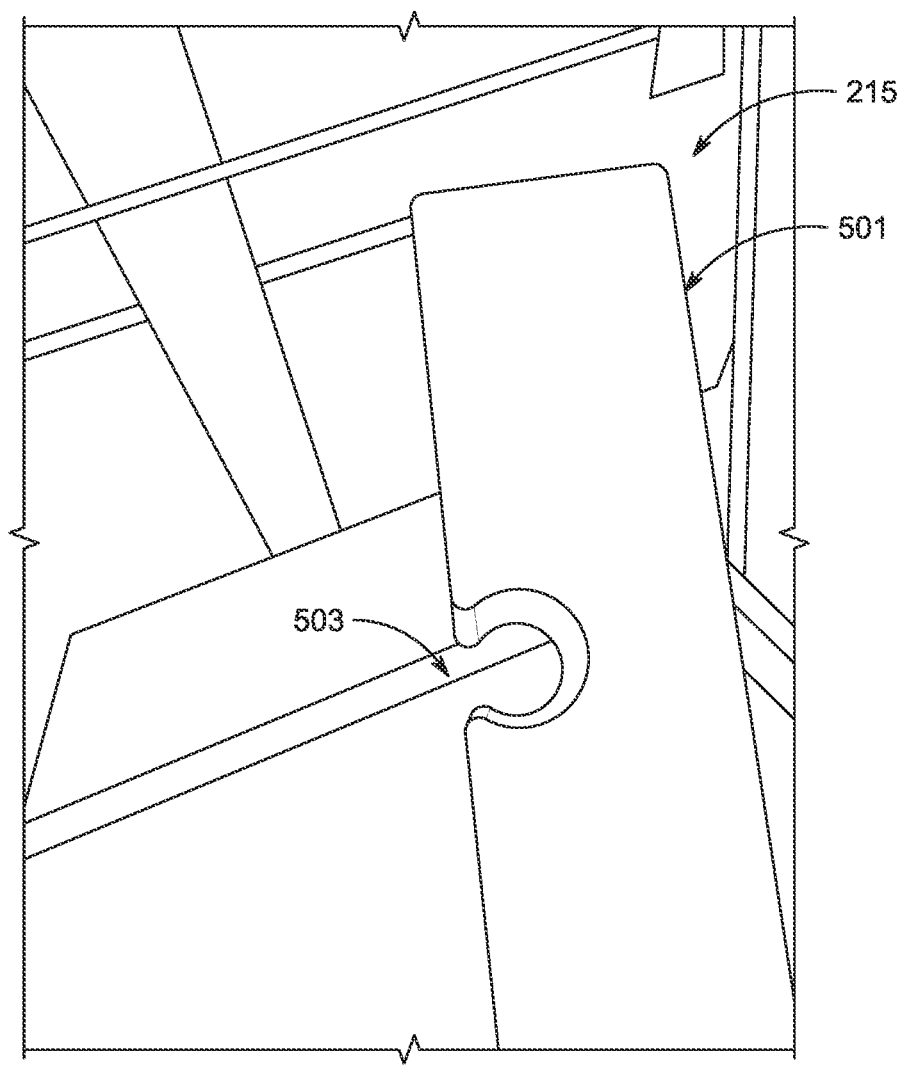
FIG. 5 is a side view of an alternative embodiment of a leverage device in accordance with the present invention.

As shown in FIG. 4, leverage device 215 further includes an opening 401 through which the axle 213 extends. It should be appreciated that the opening 401 extends from the first side end to the second side end of the body. As shown in FIG. 5, in some embodiments, the opening 503 extends directly inward from the back surface 501, thereby allowing for the leverage device 215 to snap onto the axle.

Figure 6A:
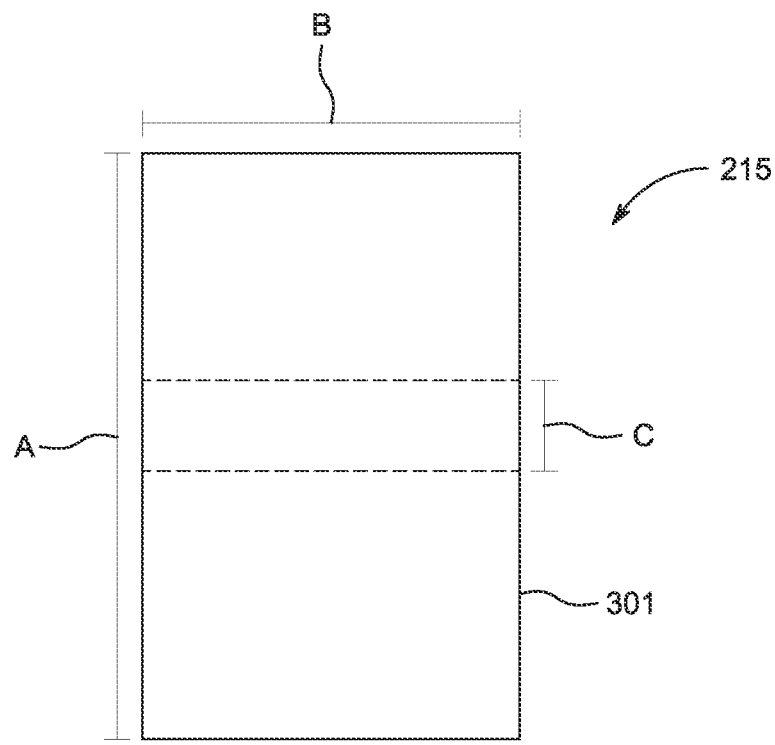
FIG. 6A is a front view of the leverage device of FIG. 2 demonstrating contemplated dimensions.
Figure 6B:
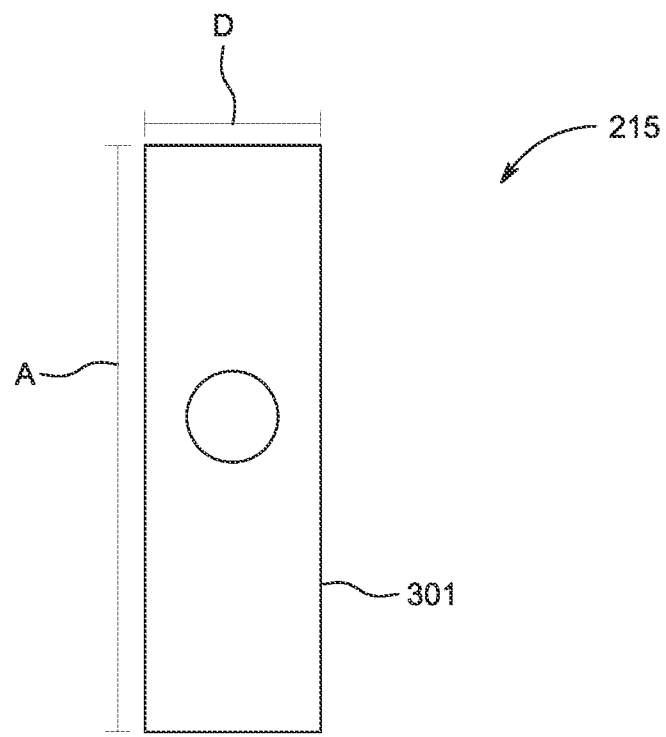
FIG. 6B is a side view of the leverage device of FIG. 2 demonstrating contemplated dimensions.

In FIGS. 6A and 6B, contemplated dimensions of the leverage device 215 are shown. It should be appreciated that the dimensions can vary in alterative embodiments. In one contemplated embodiment, the body 301 has a depth (D) of 1.5 inches, a width (B) of 3.25 inches, and a height (A) of 6.5 inches. The diameter (C) of the opening can vary, however, in one embodiment, the diameter is approximately $^{11}/_{16}{}^{th}$ of an inch. The body 301 in the preferred embodiment is composed from recycled plastic, however, it should be appreciated that alternative materials may be used.

Figure 7:
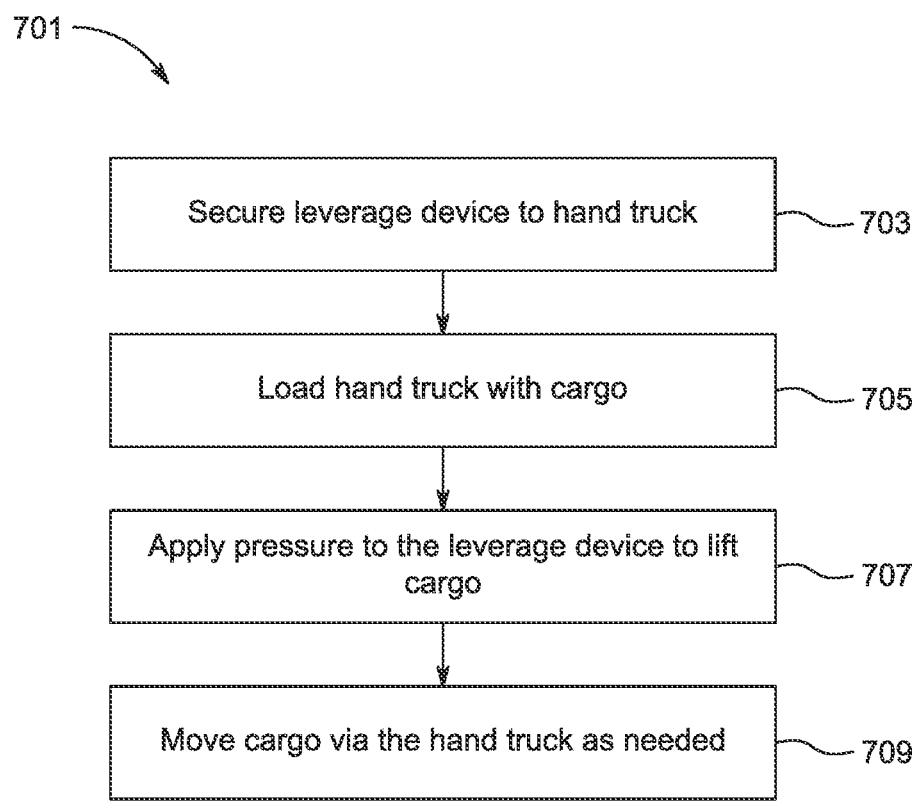
FIG. 7 is a flowchart of a method of use of the leverage system for a hand truck in accordance with the present invention.

In FIG. 7, a flowchart 701 depicts the method of use of system 201. During use, the leverage device is secured to the axle of the hand truck, as shown with box 703. It should be appreciated that the leverage device will either be snapped on or the axle will be inserted through the opening. The user will then load the hand truck as needed with items, such as boxes, as shown with box 705. Next, the user will utilize the leverage device to raise the cargo up, as shown with box 707. The user can then move the cargo as needed, as shown with box 709.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A leverage device for use with a hand truck having wheels, the leverage device comprising:

a body extending a length from a top end to a bottom end and a width from a first side end to a second side end, the body having a front surface and a back surface, the length of the body is less than a diameter of the hand truck wheels; and an opening extending from the first side end to the second side end;

wherein the opening receives an axle of the hand truck; and wherein the front surface receives a user's foot to apply leverage to the hand truck.

2. The device of claim 1, wherein the opening extends inwardly from the back surface of the body toward the front surface of the body.

3. The device of claim 1, further comprising: a textured surface on the front surface.

4. The device of claim 1, wherein the body has a depth of 1.5 inches, a width of 3.25 inches, and a height of 6.5 inches.

5. The device of claim 1, wherein the body is composed of recycled plastic.

6. A leverage system for applying leverage to a hand truck, the system comprising:

the hand truck, having:
a frame with a handle;
at least two wheels extending from the frame; and an axle extending between the at least two wheels;

a leverage device, having:
a body extending a length from a top end to a bottom end and a width from a first side end to a second side end, the body having a front surface and a back surface, the length of the body is less than a diameter of the hand truck wheels; and
an opening extending from the first side end to the second side end;
wherein the opening receives an axle of the hand truck; and
wherein the front surface receives a user's foot to apply leverage to the hand truck.

7. The system of claim 6, wherein the opening extends inwardly from the back surface of the body toward the front surface of the body.

8. The system of claim 6, further comprising: a textured surface on the front surface.

9. The system of claim 6, wherein the body has a depth of 1.5 inches, a width of 3.25 inches, and a height of 6.5 inches.

10. The system of claim 6, wherein the body is composed of recycled plastic.

* * * * *